July 12, 1938. J. COTAL 2,123,769
SPEED CHANGING GEAR
Original Filed Aug. 13, 1935  2 Sheets-Sheet 1

J. Cotal
INVENTOR

July 12, 1938.  J. COTAL  2,123,769
SPEED CHANGING GEAR
Original Filed Aug. 13, 1935  2 Sheets-Sheet 2

Fig. 4ᵃ

J. Cotal
INVENTOR

By: Glascock Downing & Seebold
Attys

Patented July 12, 1938

2,123,769

UNITED STATES PATENT OFFICE 2,123,769

SPEED CHANGING GEAR

Jean Cotal, Paris, France

Original application August 13, 1935, Serial No. 36,029. Divided and this application May 17, 1937, Serial No. 143,224. In Great Britain September 21, 1934

1 Claim. (Cl. 74—276)

The present invention, which is a division of my copending application 36,029, filed on August 13, 1935, relates to speed changing gears. In the known gears of this type, the connection between the driving shaft and the engine on one hand and the connection between the driven shaft and the members to be driven on the other hand are situated at the opposite ends of the speed changing gear.

According to the present invention, the driven shaft of the speed changing gear is adapted to control directly propelling devices located between the source of power and the gear case. This application may be advantageous in the case of certain vehicles having front driving wheels.

A securing device further permits of maintaining the stopping of the driven shaft, independently of all electric power, in order to ensure the stopping of said shaft in all cases.

In the accompanying drawings are given by way of example, several embodiments of the invention.

Fig. 1a is a partial section of the device which maintains the driven shaft of Fig. 1 stationary, but in a position different from the one shown in Fig. 1.

Fig. 4a is a partial section of the device which maintains the driven shaft of Fig. 4 stationary, but in a position different from the one shown in Fig. 4.

Figure 1:
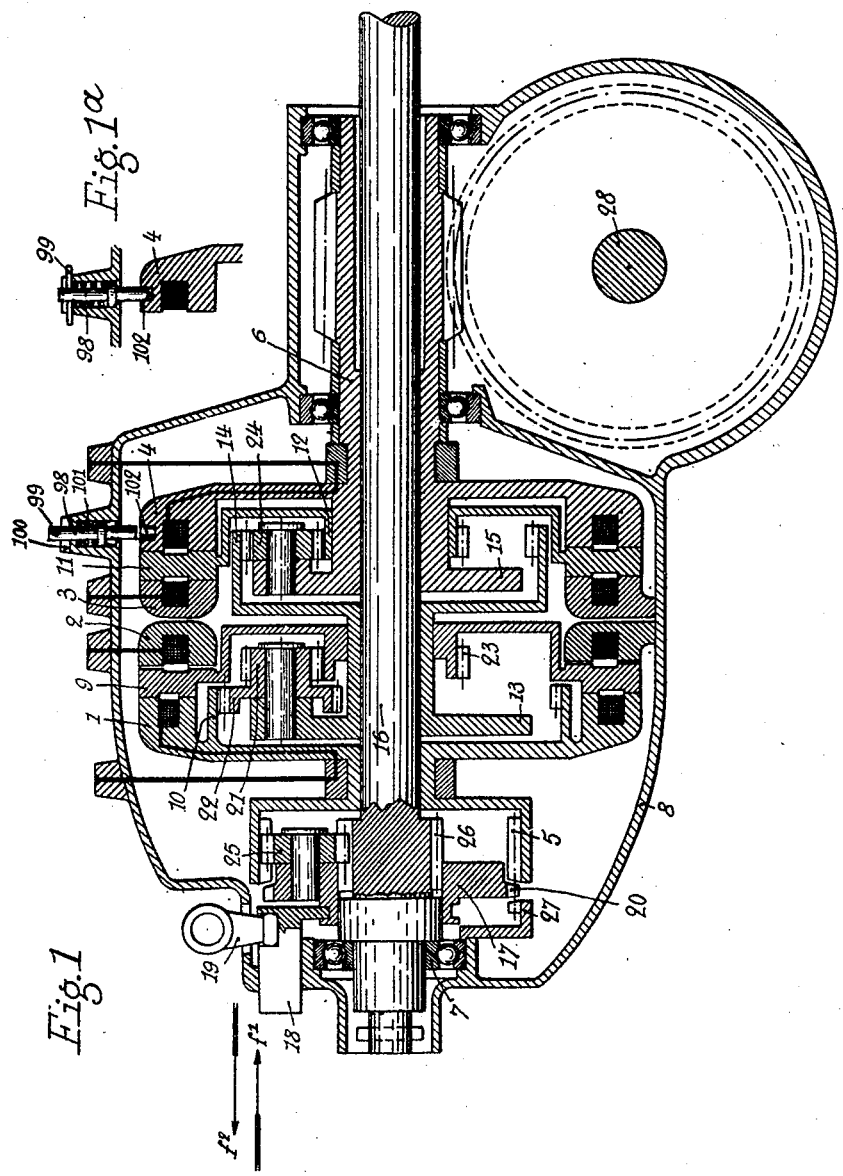
Fig. 1 represents, in longitudinal section, a gear-box for four forward speeds with electric control and for reverse drive with mechanical control, and adapted to actuate, on direct drive, wheels or propelling means situated between the driving element and the speed-changing box.

The apparatus represented in Fig. 1 consists of two planetary sets which are controlled by electromagnets 1, 2, 3, 4.

The rotatable electromagnet 1 is secured to a driving sun-wheel 5. The rotatable electromagnet 4 is secured to the driven shaft 6. The fixed electromagnet 2 and the fixed electromagnet 3 are secured to the casing 8. An armature 9, secured to the loose sun-wheel 23 may be coupled either to the rotating electromagnet 1 or to the fixed electromagnet 2. Another armature 11, secured to the sun-wheel 12, may be coupled either to the fixed electromagnet 3 or to the rotating electromagnet 4.

The planetary pinion carrier 13 of the first gear set is secured to the orbit gear 14 of the second gear set. Upon the said planetary pinion carrier 13 are rotatably mounted the planetary pinions 21 and 22 which have different diameters but are secured together, and they engage respectively the sun-wheel 23 and the orbit gear 10.

The planetary pinion carrier 15 of the second gear set is secured to the driven shaft 6, and it carries the planetary pinions 24 engaging the sun-wheel 12 and orbit gear 14.

The driving orbit gear 5 receives the movement of the driving shaft 16 through the intermediary of an auxiliary gear set situated at the front in the casing; the planetary pinion carrier 17 of this set can be displaced on its axis of rotation by means of the fork 18 of the lever 19. The arrow $f^1$ corresponds to the operation with forward drive. The arrow $f^2$ corresponds to the operation with reverse drive. The intermediate position represented in the drawing corresponds to the neutral position or idle position. The planetary pinion carrier 17 carries the planetary pinions 25 in engagement with the orbit gear 5 and also with the sun-wheel 26 secured to the driving shaft 16.

The driving shaft 16 traverses the whole apparatus, and may thus be actuated by the engine on the side next the projecting part of the driven shaft 6. In this case the driven shaft 6 may act directly through worm gear, pinions or like means, upon the parts to be actuated, such as the shaft 28.

The fork 18 is pushed according to the arrow $f^1$ in such way as to engage the teeth 20 of the planetary pinion carrier 17 with the teeth of the orbit gear 5, in order to connect the said gear 5 with the driving shaft 16, and this affords the different speeds for forward drive, as follows:

*First speed.*—The electromagnets 2 and 3 are energized; the sun-wheels 23 and 12 are held stationary. This affords two successive speed reduction ratios, one for each gear set.

*Second speed.*—The electromagnets 2 and 4 are energized; the speed reduction ratio is afforded by the first gear set, and the second set is on direct drive.

*Third speed.*—The electromagnets 1 and 3 are energized; the first gear set is on direct drive, and the second set affords the speed reduction ratio.

*Fourth speed.*—The electromagnets 1 and 4 are energized; the two gear sets operate on direct drive.

*Reverse drive.*—In order to obtain the reverse drive, the planetary pinion carrier 17 is pushed according to the arrow f² and its teeth 20 enter into the fixed toothed ring 27, in which it is thus held fast.

As the driving shaft 16 acts by its gear wheel 26 upon the planetary pinions 25 of the planetary pinion carrier 17, these planetary pinions, whose axes are in the fixed position, will push the orbit gear 5 in the contrary direction. This affords, for the gear 5, a reverse motion at a reduced speed, which can, if necessary, be further reduced at will by the use of the magnetic devices 1, 2, 3, and 4, thus providing any one of the intermediate speeds.

In Fig. 1, the axis of the casing is perpendicular to the axis of rotation 28 of the parts to be operated.

Figure 2:
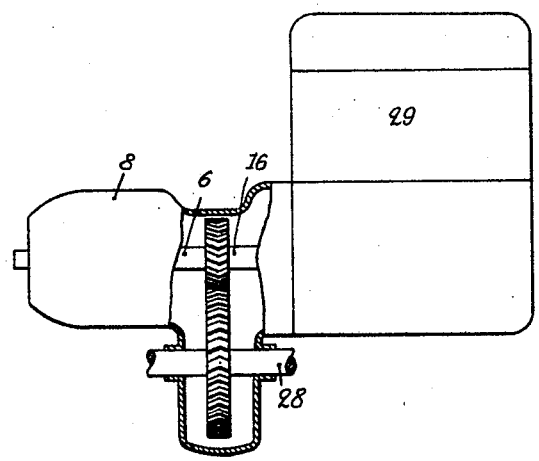
Figs. 2 and 3 are front and side views showing a modification of the box represented in Fig. 1.
Figure 3:
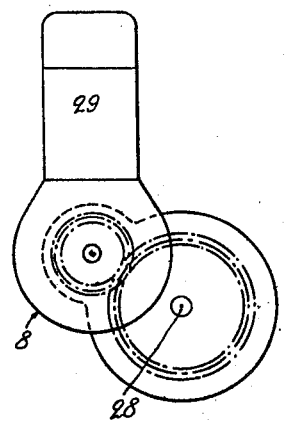

In Figs. 2 and 3, the axis of the gear box, represented by its casing 8, is parallel to the axis of rotation 28 of the actuated parts, the engine being diagrammatically represented at 29.

It will be observed on the other hand that it is feasible to transmit the movement between the axes 16 and 28 which are situated in different planes, even if they make an angle with each other.

Figure 4:
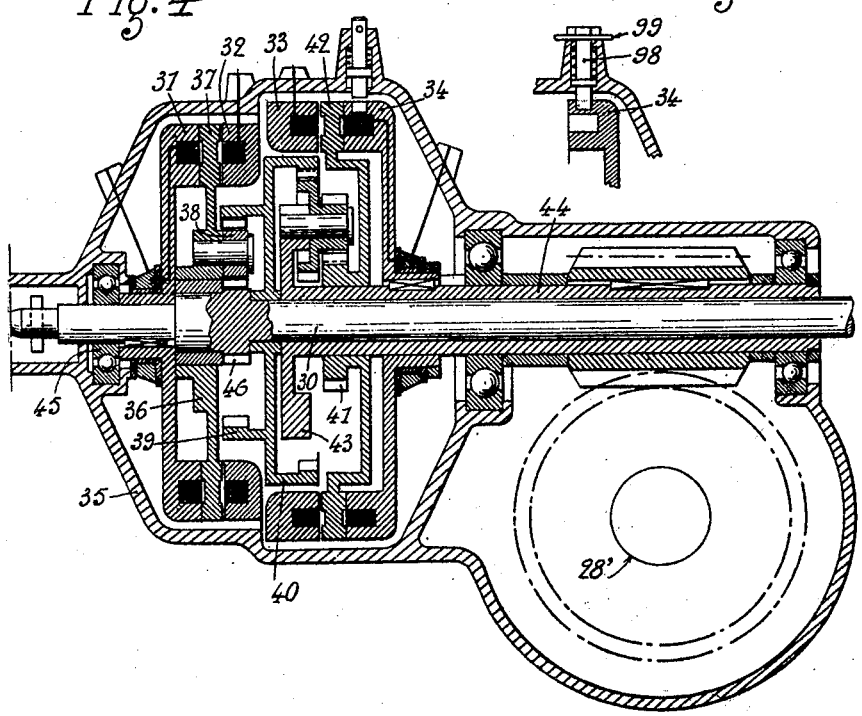
Fig. 4 represents a box for two forward speeds and reverse drive, with electric control, also adapted to actuate wheels or propelling means situated between the driving element and the gear-box.

Fig. 4 shows a mechanism which comprises the same features as in the first figure, but in which there are only employed two speeds for forward drive, and herein the transfer to forward drive or to reverse drive is obtained by electric means.

The operation is as follows:

*Forward drive at the first speed.*—The rotatable electromagnet 31 secured to the driving shaft 30, and the fixed electromagnet 33 secured to the casing 35, are both energized. The planetary pinion carrier 36 secured to the armature 37 is thus driven at the same speed as the driving shaft 30, and by means of the planetary pinions 38, the orbit gear 39 and hence the orbit gear 40, will also rotate at the same speed as the driving shaft 30. On the other hand, the sun-wheel 41, secured to the armature 42, is held fast, and this affords, for the planetary pinion carrier 43 and hence for the driven shaft 44 a reduced speed.

*Forward drive at the second speed.*—The rotatable electromagnet 31 secured to the driving shaft 30, is energized, as well as the rotatable electromagnet 34 secured to the driven shaft 44, which is thus operated on direct drive.

*Reverse drive.*—The reverse drive is obtained by energizing the fixed electromagnet 32. The planetary pinion carrier 36 is held fast. The driving shaft 30 acts by its gear wheel 46 upon the planetary pinions 38 of the planetary pinion carrier 36, which is held in the fixed position, and hence these pinions will drive the orbit gear 39 in the reverse direction. This will afford, for this gear, a reverse drive at reduced speed, which can be transmitted, either directly or after another speed reduction, to the driven shaft 44, which controls directly a device 28' located between the engine and the gear box.

The said mechanisms are further provided with a device permitting of holding the driven shaft in position, independently of the use of electric energy, in order to prevent, for example (aside from all other braking means) a vehicle from being moved on account of a slope of the ground. As shown in Figs. 1 and 4, in order to place this device in operation from the outside of the casing, a rod 98, which is normally held in the raised position by a pin 99, bearing upon the casing, may be turned in such way that the said pin 99 will engage in a groove 100 in the casing, and thus the said rod 98, driven by the spring 101, will enter a recess 102 in the electromagnet 4 or 34 secured to the driven shaft 6 or 44, as shown in Figs. 1ª and 4ª.

Obviously, the invention is not limited to the methods of execution above described, which are susceptible of numerous modifications.

Having now described my invention what I claim as new and desire to secure by Letters Patent is:

In combination a driving shaft, a driven shaft, two concentrically disposed gears, one of said gears being adapted to be connected with said driving shaft and to be rotated by said driving shaft, a wheel carrier secured to said driven shaft, planetary wheels rotatably mounted on said wheel carrier and adapted to mesh with said gears, a fixed electromagnet, a rotatable electromagnet secured to said driven shaft, an armature secured to the other of said gears and adapted to be attracted by said electromagnets, a stop surface connected with said driven shaft and rotatable electromagnet, and a fixed stop member adapted to be brought into and out of the path of said stop surface.

JEAN COTAL.